Patented Mar. 18, 1930

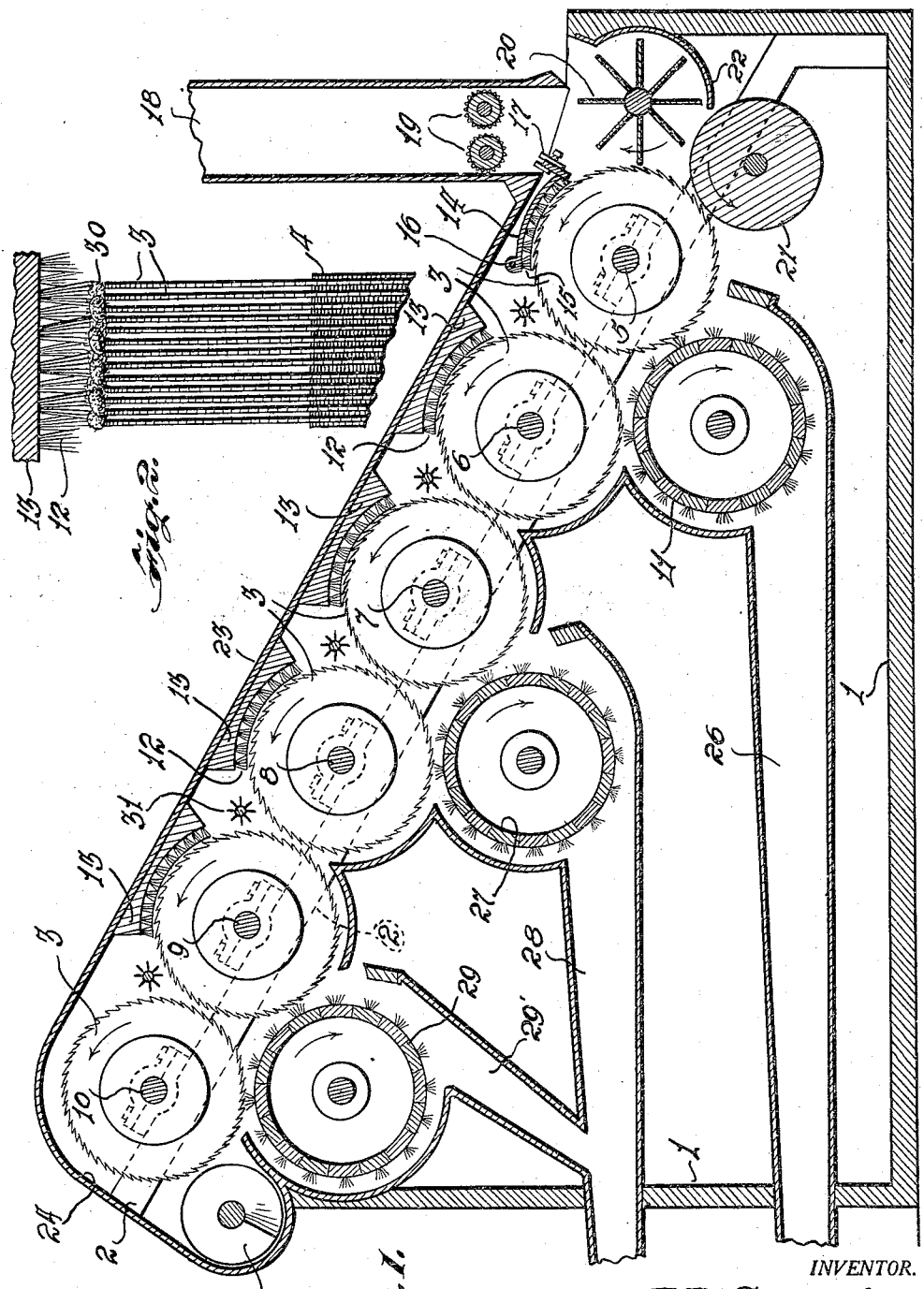

1,751,306

UNITED STATES PATENT OFFICE

FREDERICK B. CUMPSTON, OF BLOOMING GROVE, TEXAS, ASSIGNOR TO ASSOCIATED FACTORIES CORPORATION, OF DALLAS, TEXAS, A CORPORATION OF DELAWARE

COTTON GIN

Application filed December 9, 1929. Serial No. 412,867.

This invention relates to improvements in cotton gins and in such connection the invention has special reference to that type of cotton gin described in an application for patent by the applicant herein and filed in the United States Patent Office on September 6, 1929, under Serial Number 390,699, and also to an application for patent filed by the present applicant on September 16, 1929, covered by Serial Number 392,914.

In both of said applications there is involved, so far as the inventor is aware, a new principle for the successful operation of a cotton gin without the inclusion in the mechanism of what is known in the art as gin ribs, that is the elements between which the gin saws revolve in the separation of the cotton fibre from its seed.

The present invention embodies the same principle in the construction of a cotton gin, but in addition has for its object to improve the mechanism employed in said principle and whereby the cotton seed are passed between the gin saws and a series of brushes in the removal of the fine and small particles of lint adhering to the seed.

Another particular object of this invention is the employment and inclusion in the mechanism for finally separating the cotton seed from the lint by centrifugal force after the seed are thoroughly cleaned of fibre and depositing the seed by such action or force into a customary seed conveyor.

The invention also includes other and lesser yet important objects necessary to carry out the proper functioning of the gin mechanism built upon the aforementioned principle.

In the drawings annexed hereto and made a part of this specification:

Figure 1 illustrates a sectional view through that portion of a gin containing the assembly of gin saws and coacting parts and representing an embodiment of a mechanism operable upon said principle; and Figure 2 represents a sectional detail view of several of the saws on one shaft and illustrating these saws in cooperative relation with a brush segment, with a collection of cotton seed between the brush and saws.

In carrying out the invention there is included the usual housing or framework 1 and in the housing there is provided in this instance the inclined beams 2, preferably at each side of the housing and upon which beams are spaced a number of saw shafts, each shaft having mounted thereon a number of gin saws. These saws are indicated by the numeral 3 in Figure 2 to show their closely arranged position on the shafts and between each saw there is placed a plate or suitable element 4 to hold the saws in spaced relation on the shafts.

In carrying out the principle involved, the saws are made to revolve in paired series, that is it is necessary to have two shafts, each with saws, with one shaft revolving faster than the one below, so that the cotton with the seed will be combed or pulled and carded between the saws. For this reason, and as noted in Figure 1, the teeth of each adjacent saw series are spaced apart just enough to permit the fibre to be taken from the seed, but preventing the seed from passing. For instance, the lowermost shaft 5 will be made to revolve at a certain rate of speed and the next shaft 6 at a higher rate of speed, and the remaining shafts 7, 8, 9 and 10 will each revolve at a higher rate of speed. Following this it will now be apparent that the cotton when fed between, say the saws 3 on the shafts 5 and 6, will be carded, combed or pulled by the action of the saw teeth, and the lint will be directed past the saws and doffed from the saw teeth by the brush roll 11, while the seed and balance of the fibre which is en masse will be carried around between the brushes 12 on the circular breast 13 and pass in between the next series of saw teeth. While the circular breasts 13 carrying the brushes 12 are shown stationary, one or all of them may be arranged adjustably as shown by such adjustable breast 14 with the brushes 15, this breast being hinged or pivoted at 16 to the side walls of the housing and held in such position by the screw clamp 17. However, any convenient and practical means may be employed to adjust these breasts with the brushes to co-act with the saw teeth, and as illustrated one or all of them may be so adjusted, depending upon the requirements.

There is also provided a feed chute 18 with feed rolls 19 and below the feed rolls there is an agitator 20, the latter operating to keep the cotton up against the saws when it is being introduced. There is also disposed beneath the agitator 20 and the first series of saws a smooth surfaced roller 21, and this roller revolves in the same direction as the saws, while the agitator has an opposite turning direction, and in this manner the cotton from the chute is kept against the saws as it is being fed into the gin. The agitator has a co-acting solid steel breast 22.

The circular breasts carrying the brushes, as indicated at 13, are preferably attached to the inclined apron 23 which forms a covering for the housing at this point, and this apron is turned over the end of the housing at 24 and the inside surface of this apron at 24 serves to deflect the cleaned cotton seed, which are thrown outward by the last series of saws 3 on the shaft 10. As the seed are thrown by the centrifugal force against the curve of the apron, they are caught in the seed conveyor 25. Special attention is called to the means here used for depositing the seed into the conveyor, as this departs from the regular and customary manner of performing this function and this feature is considered new.

The invention also comprises an arrangement for drawing from the machine cotton with the long fibre, that is such cotton as is not allowed to pass entirely through the machine. In this connection there is provided a delivery chute 26 with roll brush 11 and a delivery chute 28 with brush roll 27. A third brush roll 29 is disposed beneath the uppermost saws to doff the cotton fibre therefrom. Thus such cotton fibre as is passed between the saw teeth of the saws carried on the saw shafts 5, 6 and 7 will be carried into the chute 26, while the cotton fibre which will necessarily be shorter due to its further treatment will be doffed from the saws 3 carried on the shafts 8, 9 and 10 and deposited into the chute 28 and into the by-pass chute 29'.

From the foregoing it will be apparent that the cotton seed can be thoroughly cleaned of cotton fibre and that the absence of the customary gin ribs in no way detracts from the practical and successful operation of the machine. In Figure 2 there is illustrated a sectional view through a series of the saws and curved breasts with the brushes, and whereby the seed 30 are shown in the position assumed in passage between the saw teeth and the brushes. There is just sufficient space between these saw teeth and the brushes 12 to permit the seed 30 to co-act with the teeth and brushes and the seed are caused to be turned over and around by the brushes and saw teeth in cleaning them of lint. Between each series of saws there is placed a spiked roller 31, and these rollers keep the cotton moving from one series of saws to the other.

It is thought that the preceding explanation will make clear the operation of the machine and that further description will not be necessary. Apart from the arrangement of the saws involving the principle involved, however, it is apparent that modifications are capable of being made, such changes or modifications to come within the scope and meaning of the appended claims.

It will be obvious that, while the term "saws" has been used as defining the means for stripping cotton from the seed, nevertheless any equivalent ginning instrumentalities may be employed without departing from the spirit of the invention.

What is claimed as new is:

1. A ribless cotton gin, linter or delinter, comprising means for stripping cotton from the seed, said means consisting solely of a series of coacting ginning instrumentalities rotating in the same direction and spaced apart just sufficiently to permit passage of lint between the ginning instrumentalities, but without permitting passage of cotton seed, the speeds of said rotating members increasing progressively from one to another, the peripheral speed of the ginning instrumentality at the high-speed end of the series being sufficient to remove cotton seed therefrom by centrifugal force.

2. A ribless cotton gin, linter or delinter, comprising means for stripping cotton from the seed, said means consisting solely of coacting ginning instrumentalities rotating in the same direction and spaced apart just sufficiently to permit passage of lint between the ginning instrumentalities, but without permitting passage of cotton seed, said ginning instrumentalities being mounted on parallel shafts whose axes are located in an inclined plane, the speeds of said rotating members increasing progressively from the lowermost to the uppermost members, the peripheral speed of the uppermost ginning instrumentality being sufficient to remove cotton seed therefrom by centrifugal force.

3. A ribless cotton gin, linter or delinter, comprising means for stripping cotton from the seed, said means consisting solely of coacting ginning instrumentalities rotating in the same direction and spaced apart just sufficiently to permit passage of lint between the ginning instrumentalities, but without permitting passage of cotton seed, said ginning instrumentalities being mounted on parallel shafts whose axes are located in an inclined plane, the speeds of said rotating members increasing progressively from the lowermost to the uppermost members, the peripheral speed of the uppermost ginning instrumentality being sufficient to remove cotton seed therefrom by centrifugal force, and a seed conveyor for receiving such cotton seed and removing it from the gin.

4. A ribless cotton gin, linter or delinter, comprising means for stripping cotton from the seed, said means consisting solely of coacting ginning instrumentalities rotating in the same direction and spaced apart just sufficiently to permit passage of lint between the ginning instrumentalities, but without permitting passage of cotton seed, said ginning instrumentalities being mounted on parallel shafts whose axes are located in an inclined plane, the speeds of said rotating members increasing progressively from the lowermost to the uppermost members, the peripheral speed of the uppermost ginning instrumentality being sufficient to remove cotton seed therefrom by centrifugal force, a seed conveyor for receiving such cotton seed and removing it from the gin, and an inclined apron at the upper portion of the gin for directing the cotton seed removed from the uppermost ginning instrumentality into said conveyor.

5. A ribless cotton gin and linter, comprising means for stripping cotton from the seed, said means consisting solely of a plurality of pairs of coacting ginning instrumentalities rotating in the same direction and spaced apart just sufficiently to permit passage of lint between the ginning instrumentalities, but without permitting passage of cotton seed, and means for separately withdrawing lint of different lengths of fiber from different portons of the gin.

6. A ribless cotton gin, linter or delinter, comprising means for stripping cotton from the seed, said means consisting solely of coacting ginning instrumentalities rotating in the same direction and spaced apart just sufficiently to permit passage of lint between the ginning instrumentalities, but without permitting passage of cotton seed, said ginning instrumentalities being mounted on parallel shafts whose axes are located in an inclined plane, the speeds of said rotating members increasing progressively from the lowermost to the uppermost members, means for supplying cotton to the lowermost of said rotating ginning members, means for removing cotton seed adjacent the uppermost ginning member, and means for withdrawing cotton of different lengths of fiber separately from different portions of the gin.

7. A ribless cotton gin, linter or delinter, comprising means for stripping cotton from the seed, said means consisting sloely of a series of coacting ginning instrumentalities rotating in the same direction and spaced apart just sufficiently to permit passage of lint betwen the ginning instrumentalities, but without permitting passage of cotton seed, means for feeding cotton at one end of the series, means for advancing the material being ginned from one ginning instrumentality to another, means for removing cotton seed at the other end of the series, doffers located adjacent each pair of ginning instrumentalities for withdrawing lint which has passed between the ginning instrumentalities, and brushes located on the side of said ginning instrumentalities opposite said doffers for removing lint from the cotton seed in passing.

8. A ribless cotton gin, linter or delinter, comprising means for stripping cotton from the seed, said means consisting solely of a series of coacting ginning instrumentalities rotating in the same direction and spaced apart just sufficiently to permit passage of lint between the ginning instrumentalities, but without permitting passage of cotton seed, means for feeding cotton at one end of the series, means for advancing the material being ginned from one ginning instrumentality to another, means for removing cotton seed at the other end of the series, doffers located adjacent each pair of ginning instrumentalities for withdrawing lint which has passed between the ginning instrumentalities, and brushes located on the side of said ginning instrumentalities opposite said doffers for removing lint from the cotton seed in passing, said brushes being curved to conform to the surfaces of said ginning instrumentalities.

9. A ribless cotton gin, linter or delinter, comprising means for stripping cotton from the seed, said means consisting solely of a series of coacting ginning instrumentalities rotating in the same direction and spaced apart just sufficiently to permit passage of lint between the ginning instrumentalities, but without permitting passage of cotton seed, means for feeding cotton at one end of the series, means for advancing the material being ginned from one ginning instrumentality to another, means for removing cotton seed at the other end of the series, doffers located adjacent each pair of ginning instrumentalities for withdrawing lint which has passed between the ginning instrumentalities, and brushes located on the side of said ginning instrumentalities opposite said doffers for removing lint from the cotton seed in passing, there being one brush for each ginning instrumentality of the series except the last.

In testimony whereof I affix my signature.

FREDERICK B. CUMPSTON.